(12) United States Patent
Korst et al.

(10) Patent No.: US 10,587,931 B2
(45) Date of Patent: Mar. 10, 2020

(54) APPARATUS AND METHOD FOR MANAGING A PERSONAL CHANNEL

(75) Inventors: Jan Korst, Eindhoven (NL); Mauro Barbieri, Eindhoven (NL); Serverius Petrus Paulus Pronk, Vught (NL)

(73) Assignee: FUNKE DIGITAL TV GUIDE GMBH (DE)

( * ) Notice: Subject to any disclaimer, the term of this patent is extended or adjusted under 35 U.S.C. 154(b) by 0 days.

(21) Appl. No.: 13/993,151

(22) PCT Filed: Jan. 4, 2012

(86) PCT No.: PCT/EP2012/050110
§ 371 (c)(1),
(2), (4) Date: Jun. 11, 2013

(87) PCT Pub. No.: WO2012/093145
PCT Pub. Date: Jul. 12, 2012

(65) Prior Publication Data
US 2013/0268975 A1    Oct. 10, 2013

(30) Foreign Application Priority Data
Jan. 4, 2011    (EP) .................................... 11150105

(51) Int. Cl.
*H04N 21/482* (2011.01)
*H04N 5/445* (2011.01)
(Continued)

(52) U.S. Cl.
CPC ....... *H04N 21/4828* (2013.01); *G06F 16/735* (2019.01); *G06F 16/78* (2019.01);
(Continued)

(58) Field of Classification Search
CPC .......... H04N 21/4622; H04N 21/4677; H04N 21/4668; H04N 21/4828; H04N 21/4826; H04N 21/4756; H04N 21/4788
See application file for complete search history.

(56) References Cited

U.S. PATENT DOCUMENTS 5,859,662 A * 1/1999 Cragun et al. ................ 725/137
6,005,565 A   12/1999 Legall et al.
(Continued)

FOREIGN PATENT DOCUMENTS

CN          1591420 A    3/2005
CN        101046804 A   10/2007
(Continued)

*Primary Examiner* — Pankaj Kumar
*Assistant Examiner* — Timothy R Newlin
(74) *Attorney, Agent, or Firm* — Ware, Fressola, Maguire & Barber LLP

(57) ABSTRACT

The invention relates to an apparatus (100), a video system, a method and a corresponding computer program and a computer readable medium for managing a personal channel (210) of a user (200). The apparatus (100) is configured to control a search engine (300) with a specified search string (132) that the apparatus (100) has generated by combining a predefined search string (122) and a metadata piece (214). Thereby, the apparatus (100) retrieves a non-linear content (314) item being similar to a specific linear content item being referenced by the metadata piece and causes a recommendation (152) to the user (200) to add the retrieved non-linear content item to his personal channel (210).

14 Claims, 3 Drawing Sheets

(51) Int. Cl.
*H04N 21/442* (2011.01)
*H04N 21/466* (2011.01)
*H04N 21/84* (2011.01)
*H04N 21/475* (2011.01)
*G06F 16/735* (2019.01)
*G06F 16/78* (2019.01)

(52) U.S. Cl.
CPC ....... *H04N 5/445* (2013.01); *H04N 21/44222* (2013.01); *H04N 21/4667* (2013.01); *H04N 21/4668* (2013.01); *H04N 21/4756* (2013.01); *H04N 21/84* (2013.01)

(56) References Cited

U.S. PATENT DOCUMENTS

| | | | |
|---|---|---|---|
| 6,184,877 B1* | 2/2001 | Dodson et al. | 725/110 |
| 6,662,177 B1* | 12/2003 | Martino et al. | |
| 6,748,375 B1* | 6/2004 | Wong et al. | |
| 7,793,326 B2* | 9/2010 | McCoskey et al. | 725/91 |
| 8,250,609 B1* | 8/2012 | Henty | 725/53 |
| 2002/0144281 A1 | 10/2002 | Taguchi et al. | |
| 2003/0028889 A1* | 2/2003 | McCoskey | H04N 7/17318 725/91 |
| 2003/0126227 A1* | 7/2003 | Zimmerman et al. | 709/217 |
| 2004/0123318 A1* | 6/2004 | Lee et al. | 725/46 |
| 2004/0123319 A1* | 6/2004 | Kim | 725/53 |
| 2004/0194141 A1* | 9/2004 | Sanders | 725/53 |
| 2005/0022239 A1* | 1/2005 | Meuleman | 725/46 |
| 2005/0097606 A1* | 5/2005 | Scott et al. | 725/52 |
| 2005/0234881 A1* | 10/2005 | Burago et al. | 707/3 |
| 2006/0015902 A1* | 1/2006 | Matsuura et al. | 725/46 |
| 2006/0064724 A1* | 3/2006 | Kwon et al. | 725/52 |
| 2006/0101504 A1* | 5/2006 | Aravamudan et al. | 725/136 |
| 2006/0236343 A1* | 10/2006 | Chang | 725/61 |
| 2006/0253428 A1 | 11/2006 | Katariya et al. | |
| 2008/0097984 A1* | 4/2008 | Candelore | 707/5 |
| 2008/0163328 A1* | 7/2008 | Philbin et al. | 725/139 |
| 2008/0271080 A1* | 10/2008 | Gossweiler et al. | 725/47 |
| 2009/0150832 A1* | 6/2009 | Keller | G06F 3/0481 715/854 |
| 2009/0282023 A1* | 11/2009 | Bennett | 707/5 |
| 2010/0114884 A1* | 5/2010 | Tsuzuki et al. | 707/730 |
| 2010/0162164 A1* | 6/2010 | Kwon et al. | 715/803 |
| 2010/0169095 A1* | 7/2010 | Asano | 704/251 |
| 2010/0232686 A1 | 9/2010 | Dewan et al. | |
| 2012/0159543 A1* | 6/2012 | Jin et al. | 725/39 |
| 2014/0108009 A1* | 4/2014 | Chang | 704/231 |

FOREIGN PATENT DOCUMENTS

| | | |
|---|---|---|
| CN | 101689184 A | 3/2010 |
| EP | 1 463 307 A2 | 9/2004 |
| WO | 2007/103938 A2 | 9/2007 |

* cited by examiner

APPARATUS AND METHOD FOR MANAGING A PERSONAL CHANNEL

CROSS REFERENCE TO RELATED APPLICATIONS

This application is the U.S. National Stage of International Application Number PCT/EP2012/050110 filed on Jan. 4, 2012 which claims priority under 35 USC § 119 to European Patent Application No. 11150105.2 filed on Jan. 4, 2011, which applications are hereby incorporated by reference in their entirety.

FIELD OF INVENTION

The invention relates to an apparatus for managing a personal channel of a user, a method for managing a personal channel of a user, a video system with such apparatus, a corresponding computer-readable medium and a corresponding computer program. In particular, the invention relates to an apparatus which uses genre-specific phrases to store search for related internet content.

BACKGROUND OF THE INVENTION

A personal channel of a user is stored in a memory and contains personal channel data that provide information about linear and/or non-linear content items which the user likes or explicitly dislikes. For instance, a group of certain television (TV) programs are bundled into the personal channel. Instead of zapping through all available broadcast programs, the user can zap through his personal channels. For instance, a user has set up a personal news channel, a personal cartoon channel and/or a personal movie channel. Due to the fact that the amount of available content items continues to increase, such personal channels become an increasingly important tool to a user, as they offer him the possibility to quickly find a content item of interest.

In particular, a personal channel can allow one or more users of a recorder employing hard-disk technology to independently define a plurality of content items, which are similar to existing broadcast programs identified by the personal channel, but which are typically filled with recorded broadcast or from downloaded internet content. Such a personal channel is personalized, not only due to the fact that the user creates his own personal channel, but also by the fact that such a personal channel may be equipped with a recommender. This recommender learns the taste of the user of the channel by user feedback, either explicitly or implicitly, and serves to fine-tune the content of the channel.

Creating a personal channel is, for instance, done by a user by simply choosing a program from the electronic program guide (EPG) and indicating that she/he wants to create a new channel with this program. This initial program serves as a seed, and more, similar programs will be selected and/or recommended for adding to the personal channel.

A linear content item is, for instance, a broadcasted TV program or a broadcasted radio program. In contrast to a non-linear content item, a user cannot control the linear content item during broadcasting. However, he may record a linear content item and watch it later on. A non-linear content item, for instance a video content, is available from a content item source like a computer-implemented network, such as the internet or a local area network, or from a computer-implemented server. A user can choose which non-linear content item he wants to see and can control play back of the chosen non-linear content item. Thus, the term non-linear content is used to indicate video content that is not distributed via broadcasting but via other means, usually via internet streaming or download.

Metadata belonging to a linear content item is, for instance, information about a main actor, a title, a genre, significant persons and so forth. Usually, metadata is present in the form of character strings. For example, a metadata piece is a single-valued feature value pair such as {genre="movie"} or a multi-valued feature such as {actor="Al Pacino", "Robert de Niro"}.

U.S. Pat. No. 6,005,565 describes a search tool that enables to search an electronic program guide and the Internet with one search. The search tool can automatically select filter elements from predetermined program elements, namely user defined search strings, such as a title or a subject. The automatic selection of such filter elements is based on a user selected program from the electronic program guide. The selected filter elements are used for search.

SUMMARY OF THE INVENTION

It is an object of the invention to provide an apparatus that facilitates integrating data about a non-linear content item into a personal channel. It is, furthermore, an object of the invention to provide a corresponding method, a corresponding computer program and a corresponding computer-readable medium. In addition, it is also an object of the invention to provide a video system that facilitates integrating data about a non-linear content item into a personal channel of a user.

According to a first aspect of the invention, this object is achieved by providing an apparatus for managing a personal channel of a user containing a number of metadata pieces belonging to at least one linear content item, which has:
  a search string memory containing a number of predefined search strings,
  a search string generator configured to generate a specified search string by combining at least one piece of metadata with at least one predefined search string,
  a transceiver configured to control a search engine with the generated specified search string for retrieving a non-linear content item being related to the at least one linear content item, and
  a recommender engine configured to cause providing of an electronic recommendation signal to the user in dependence of a retrieved non-linear content item.

The transceiver is additionally configured to iteratively control the search engine with at least one of the number of metadata pieces for updating the search string memory by providing at least a part of a name of a search result, which has comparatively frequently occurred during the iterative operation of the search engine, as an additional predefined search string to the search string memory.

The invention includes the recognition that a conventional recommender exclusively operates with metadata of linear content items in order to retrieve similar additional linear content items and recommend a retrieved linear content item to the user. In particular, in order to find an additional TV program that is potentially of interest for inclusion into a personal channel, those additional TV programs are considered that are broadcasted in the upcoming few days. Each such TV program must match to metadata pieces stored in the personal channel, that is to say: must pass a certain filter, to be further considered for recommendation and thus for potential inclusion. For instance, a conventional recommender filters these additional TV programs on the basis of a broadcast channel, time-of-the-day and either title or genre.

The inventors have recognized that, on the one side, structured metadata is not available for non-linear content as it is for linear content, due to the various different types of non-linear content items and, on the other side, that, when searching for non-linear content items by exclusively using metadata characters strings usually yields a very large number of search results that might not be relevant. For instance, linear content item may have a metadata piece character string "Paris" indicating the title of a movie. Searching for non-linear content items which are related to the movie "Paris" by using "Paris" as a keyword would result in a very large number of search results, wherein most search results are assumingly not related to the movie "Paris" but to the city Paris in France, hotels in Paris, travel information and so forth.

A significant advantage of the apparatus of the first aspect of the invention is that due to the fact that at least one predefined search string is added to at least one piece of metadata in order to induce a query of related non-linear content items, the precision of the search results is substantially increased. Therefore, the quality of recommendation provided to the user of the apparatus is increased without having the user to interact. Due to the provided electronic recommendation signal, the user can easily add a non-linear content item to his personal channel that is semantically related to the linear content that is already in his personal channel. Almost no interaction with the user is required. The electronic recommendation signal usually presents one or more non-linear content items to the user and the user only has to decide which of the presented non-linear content items he wants to actually add to his personal channel.

Not only the precision is increased, but the apparatus is, in contrast to known apparatus, also configured to cause providing of a recommendation for a non-linear content item being semantically related to a specific linear content item and of different genre and/or of different category than the specific linear content item. For instance, a certain movie can be referenced with a metadata piece of the personal channel. The apparatus is configured to cause recommendation for non-linear content items that is not a movie, but, for instance, a "TV show" or a "trailer".

The apparatus thus constitutes a semi-automatic approach that assists a user in setting-up his personal channel with linear and non-linear content items. A general advantage of this apparatus is also that the commercial viability of the personal channel concept is increased. However, a full automatic approach where the apparatus itself adds the retrieved non-linear content item to the personal channel is also possible.

The apparatus of the first aspect of the invention rather seeks to retrieve a non-linear content item that is semantically related to one specific content item or only a few specific content items that are already referred to by existing specific metadata pieces in the personal channel rather than it is dependent on explicit user preference data that is, for instance, derivable from all metadata pieces being stored in the personal channel. In particular, it uses the specified search string that has been generated as a combination of at least one piece of metadata and the at least one predefined search string.

The apparatus is configured to automatically update the search string memory. The apparatus thus learns to associate certain predefined search strings to a certain metadata string by controlling the search engine with only the certain metadata string and checking which terms of phrases typically co-occur regularly on the return hits.

The predefined search strings can, for instance, be: "Interview with", "trailer", "deleted scenes", "making of", "literature", "TV series", "film versions", "gossip", "best of", "biography" and so on.

In the following, some embodiments of the apparatus of the first aspect of the invention are described. Additional features of the described embodiments can be combined with each other in order to form further embodiments, as far as they are not explicitly described as being alternative to each other.

The metadata pieces contained in the personal channel are usually provided by an electronic program guide (EPG). Thus, the apparatus has preferentially means for receiving the electronic program guide.

For generating a specified search string, the search string generator of the apparatus preferentially links the at least one piece of metadata with the at least one predefined search string through a Boolean term. For instance, the at least one piece of metadata is a character string with the name "Le Fabuleux destin d'Amélie Poulain" and the at least predefined search string is a character string, too, with the name "deleted scenes". The search string generator then, for instance, generates the predefined search string as a character string, wherein the latter character strings are logically linked through the logical operator (Boolean term) "AND". The transceiver then controls the search engine, for instance the search engine of a non-linear content items source like Youtube.com or Google Video, with that specified search string for retrieving certain additional film material about deleted scenes of the movie named above, which is then recommended to the user via the recommender engine.

In a preferred embodiment, the number of metadata pieces of the personal channel is present in the form of a plurality of metadata strings, each of the plurality of metadata strings specifying one aspect of the at least one linear content item. Furthermore, a number of predefined search strings is associated to one of the plurality of metadata strings. In this embodiment, the search string generator is configured to generate the specified search string by combining at least one metadata string with at least one associated predefined search string. For instance, the predefined search strings "trailer", "deleted scenes", "making of", "interviews with" are associated to the metadata string that specifies the genre "movie" of the non-linear content item. In another example, the predefined search strings "film versions" and "interviews with author" are associated to the metadata string specifying the genre "literature TV series". As another example, the predefined search string "best of" is associated to a metadata string "show".

Therefore, in this embodiment of the apparatus of the first aspect of the invention, the precision of the search results retrieved within the search induced by the transceiver of the apparatus is further increased.

In a third embodiment, the apparatus additionally comprises a first input that allows for manually adding a predefined search string to the search string memory. In this embodiment, a user who has consumed a specific linear content item and wants to find specific non-linear content item semantically related to the specific linear content item, can add a user-defined predefined search string to the search string memory, which is then used by the search string generator for generating the specified search string. It is, therefore, generally preferred that the apparatus of the invention is controllable by a user. For instance, it is preferred that a user can trigger recommendation of non-linear content items being related to a specific linear content item or to a plurality of content items that are already present in his personal channel.

In a particular preferred embodiment, the apparatus comprises a second input that allows for receiving a user initiated feedback signal and the search string generator is configured to generate the specified search string in dependence of the received feedback signal. Therefore, the apparatus of these embodiments learns which predefined search string is most effective in the search for additional non-linear content items that the user finds interesting. By using feedback of the user, either directly or indirectly, this effectiveness can be estimated such that an effective predefined search string will be used more often in future searches. Therefore, the apparatus is configured to learn the taste of the user. If certain types of additional non-linear content items are watched more often than other types of additional non-linear content items, then the apparatus uses corresponding predefined search strings more often in searches for related non-linear content items.

According to a second aspect of the invention, a video system having a receiver and a display is provided, wherein the receiver is configured to receive a linear content item provided by a broadcasting station and to receive a non-linear content item provided by a computer implemented network, and wherein the display is configured to display a received linear content item and a received non-linear content item. The receiver of the video system of the second aspect of the invention comprises a memory for storing a personal channel of the user and an apparatus according to the first aspect of the invention for managing the personal channel, wherein the apparatus has access to a search engine being coupled to the computer-implemented network. The apparatus of the video system of the second aspect of the invention is additionally configured to provide the electronic recommendation signal to the user via the display.

The video system can be a stationary video system, such as a TV set, a set top box, a personal computer, or a video game console or it can be a mobile video system, such as a mobile phone, a personal digital assistant or a notebook.

Generally, the video system of the same aspect of the invention has the same or similar advantages as the apparatus of the first aspect of the invention. In particular, the video system allows a user to easily set up one or more personal channels containing personally chosen linear and non-linear content items. Therefore, the user can quickly consume a content item of interest without having to put much effort into finding it, in particular without having to spend time zapping through the vast amount of available content items.

According to a third aspect of the invention, a method for managing a personal channel of a user containing a number of metadata pieces belonging to at least one linear content item is presented. The method comprises the steps of:
  storing a number of predefined search strings,
  generating a specified search string by combining at least one metadata piece with at least one predefined search string,
  controlling a search engine with the generated specified search string for retrieving a non-linear content item being related to the at least one linear content item, and
  providing an electronic recommendation signal to the user in dependence of the retrieved non-linear content item.

The step of controlling additionally comprises: Iteratively controlling the search engine with at least one of the number of metadata pieces for updating the number of stored predefined search strings by providing at least a part of a name of a search result, which has comparatively frequently occurred during the iterative operation of the search engine, as an additional predefined search string to the stored predefined search strings.

In particular, the method of the third aspect of the invention constitutes an operating method of the apparatus of the first aspect of the invention for managing a personal channel.

According to a fourth aspect of the invention, the computer program is presented, which has executable code that, when being executed on a computer, causes the computer to perform the steps of the managing method of the third aspect of the invention.

According to a fourth aspect of the invention, a computer-readable medium is presented, which has computer-readable code means embodied thereon, said computer-readable program code means being operative to cause a programmable system when executing said computer-readable code means to perform the managing method of the third aspect of the invention.

BRIEF DESCRIPTION OF THE DRAWINGS

The invention will now be described by way of the example based on embodiments with reference to the accompanying drawings, wherein.

DESCRIPTION OF EMBODIMENTS

Figure 1:
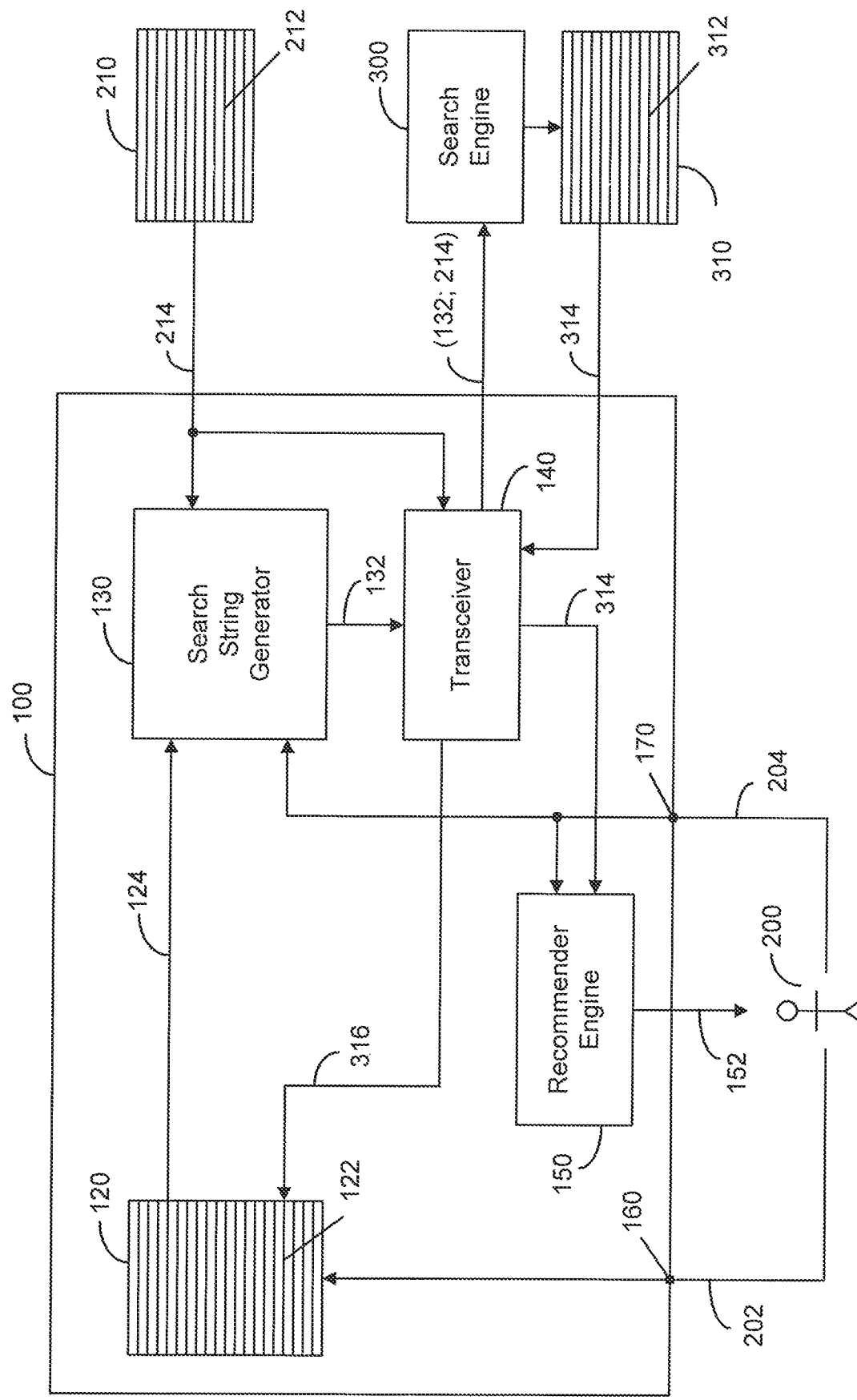
FIG. 1 shows a schematic block diagram of an embodiment of the apparatus of the first aspect of the invention.

FIG. 1 shows a schematic block diagram of an embodiment 100 of the apparatus of the first aspect of the invention. The apparatus 100 assists a user 200 in managing his personal channel 210 by recommending him to add one or more non-linear content items 312 to his personal channel 210 that the apparatus 100 has previously retrieved within a directed search. Upon receiving corresponding electronic recommendation signal 152, the user 200 can himself decide whether he wants to add the recommended non-linear content item to his personal channel 210. Alternatively, the retrieved non-linear content item is automatically added by the apparatus 100 without user intervention.

The personal channel 210 of the user 200 already contains a number of metadata pieces 212 belonging to at least one linear content item. That at least one linear content item can for instance be a TV show that is regularly broadcasted by a broadcasting station. The metadata pieces belonging to that linear content item can for instance specify the TV show by naming the genre "TV show", the moderator, the broadcasting time and/or the actors. Thus, the metadata pieces 212 are usually present in the form of a number of linked metadata strings, each of the number of metadata strings specifying one aspect of the at least one linear content item. That metadata is usually provided by an electronic program guide (EPG).

The apparatus 100 comprises a search string memory 120 containing a number of predefined search strings 122. Usually, a respective of the number of predefined search strings 122 stored in the search string memory 120 is associated to one of the number of metadata strings. A search string generator 130 of the apparatus 100 has access to that search string memory 120 and is configured to generate a specified search string 132 by combining at least one piece of metadata 214 with at least one predefined search string 124. For instance, the search string generator 130 combines the at least one predefined search string 124 with the at least one metadata piece 214 by linking the strings with a Boolean term, such as with the operator "AND".

The search string generator 130 passes generated specified search string 132 to a transceiver 140 of the apparatus 100. The transceiver 140 has an access to a search engine, which is usually implemented outside of the apparatus 100, and is configured to control the search engine 300 with the generated specified search string 132 in order to retrieve a non-linear content item being related to the at least one linear content item and, therefore, being potentially of interest to the user 200.

When being controlled by the transceiver 140, the search engine 300 delivers search results 310 which usually contain a list of links 312 pointing to non-linear content items.

The apparatus 100 furthermore comprises a recommender engine 150 which is configured to cause providing of an electronic recommendation signal 152 to the user 200 in dependence of a retrieved non-linear content item 314. This shall not necessarily indicate that the apparatus 100 automatically downloads a complete non-linear content item, such as a video from YouTube.com, but presents to the user 200 information describing the retrieved non-linear content item and suggesting to the user 200 to add that non-linear content item to his personal channel 210.

In order to improve the precision of the electronic recommendation signal 152, the user 200 can add a user-predefined search string 202 to the search string memory 120 via a first input 160 of the apparatus 100.

Furthermore, the transceiver 140 is additionally configured to iteratively control the search engine 300 with at least one of the number of metadata pieces 212 for updating the search string memory 120 by providing at least a part of a name 316 of the search result 312, which has comparatively frequently occurred during the iterative operation of the search engine 300, as an additional predefined search string to the search string memory 120.

The user 200 can train the apparatus 100 according to his preferences. The apparatus 100 comprises a second input 170 that allows for receiving a user-initiated feedback signal 204 upon being confronted with the electronic recommendation signal 152, the user 200 can rate the recommendation made to him and feed the apparatus 100 with a corresponding feedback signal 204. The search string generator 130 is configured to generate the specified search string 132 in dependence of the received feedback signal 204. Also, the recommender engine 150 is configured to monitor the user feedback signal 204 and to cause providing of the subsequent electronic recommendation signals 152 accordingly.

Figure 2:
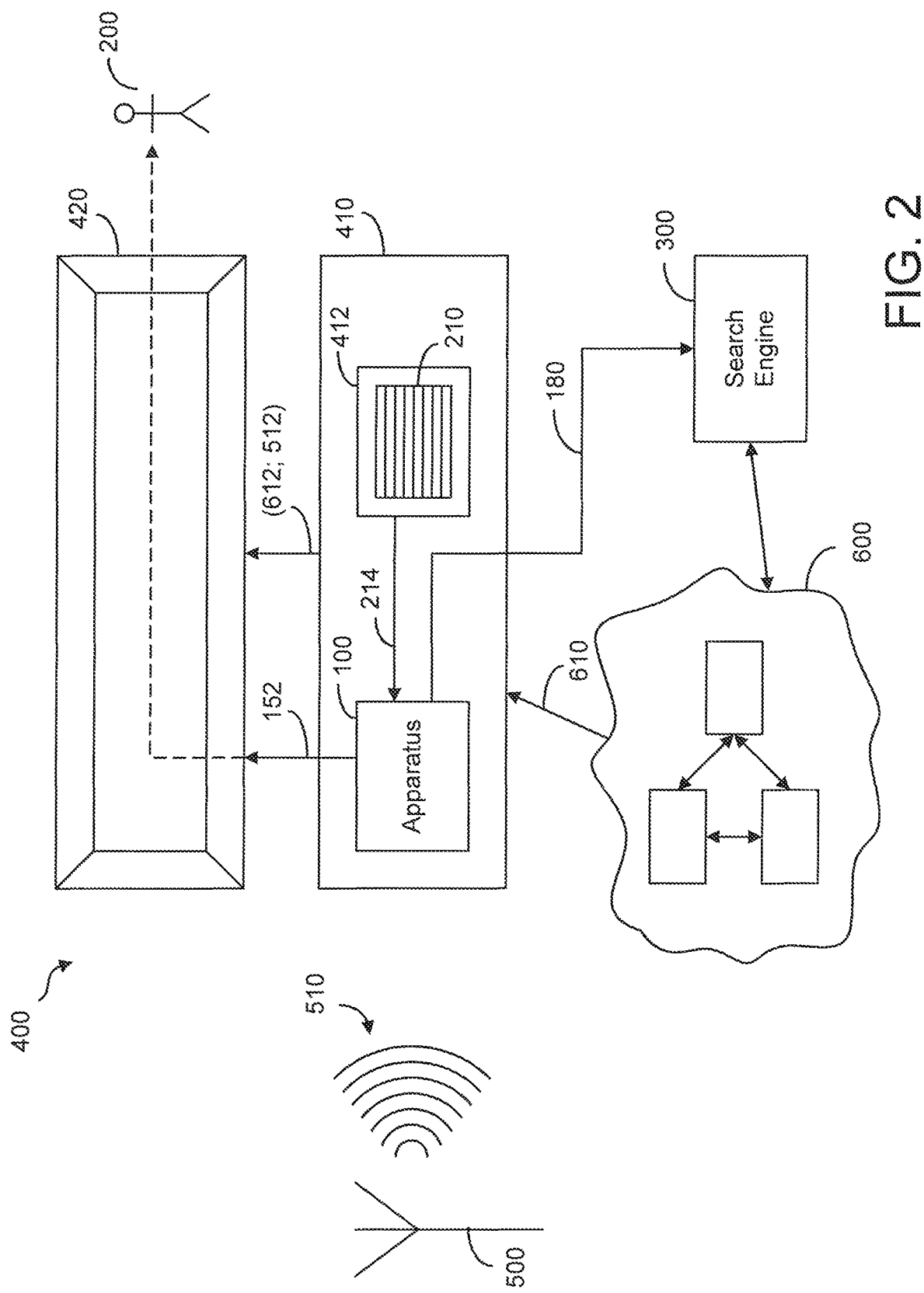
FIG. 2 shows a schematic block diagram of an embodiment of the video system of the second aspect of the invention and FIG. 3 a flowchart for illustrating an embodiment of the method of the third aspect of the invention.

FIG. 2 shows a schematic block diagram of an embodiment 400 of the video system of the second aspect of the invention. The video system 400, which can be a mobile video system or a stationary video system, has a receiver 410 and a display 420. The receiver 410 and the display 420 can be installed in a common housing or can each have a separate housing. The receiver 410 is configured to receive a linear content item 510 provided by a broadcasting station 500, for instance, the receiver 410 is configured to receive TV or radio programs. The receiver 410 is also configured to receive a non-linear content item 610 provided by a computer-implemented network 600, such as the internet or a local area network. Such non-linear content item 610 can, for instance, be a video available at youtube.com or a video-on-demand program. The display 420 is configured to display the received linear content item 512 and the received non-linear content item 612. The receiver 410 comprises a memory 412 for storing a personal channel 210 of user 200 and an apparatus 100 according to the first aspect of the invention for managing the personal channel 210. The apparatus 100 has an access 180 to search engine 300 being coupled to the computer-implemented network 600. The apparatus 100 is configured to provide the electronic recommendation signal 152 to the user 200 via the display 420.

Due to the apparatus 100 installed in the receiver 410, the user 200 can easily manage his personal channel 210 and, thus, has quick access to content items of his preferences.

Figure 3:
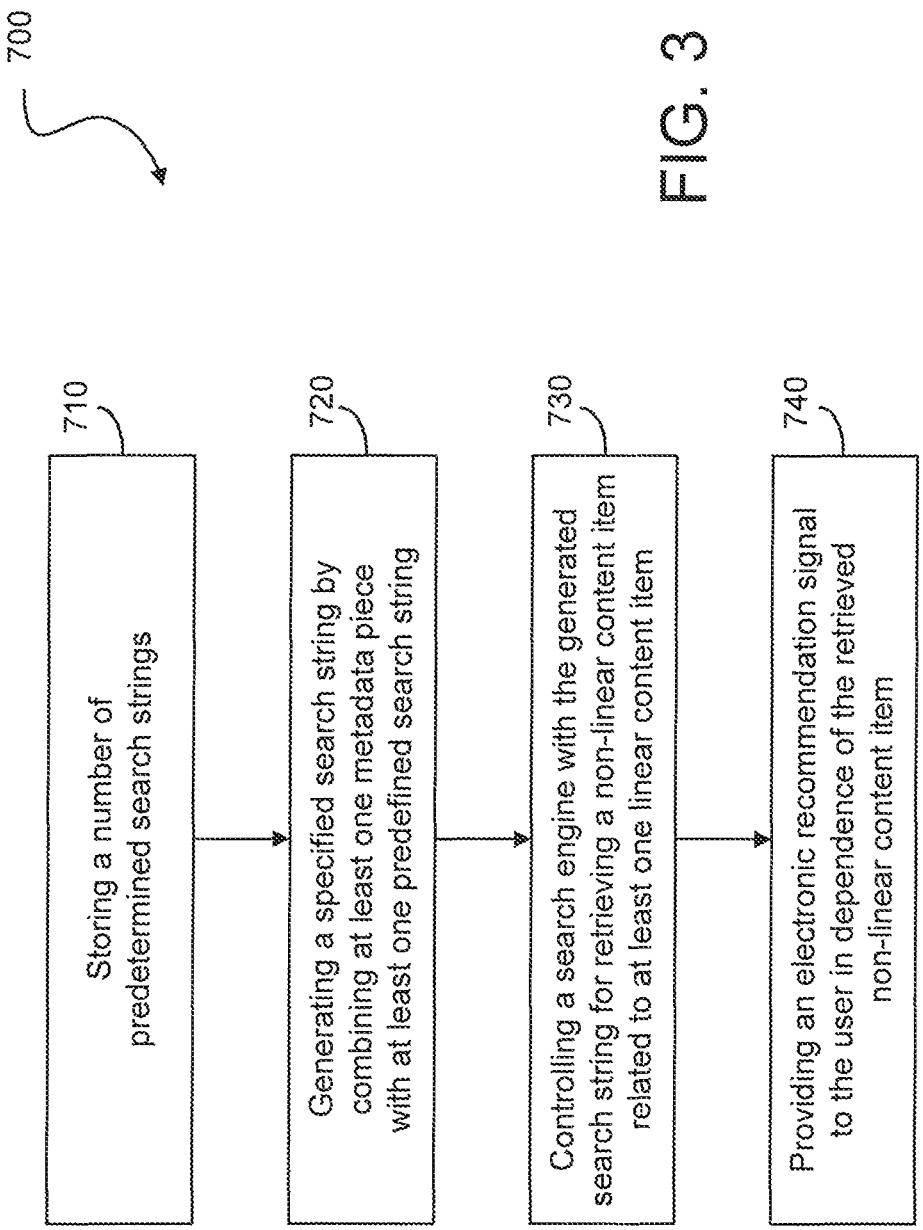

FIG. 3 shows a flowchart for schematically illustrating an embodiment 700 of the method according to a third aspect of the invention. The method 700 serves for managing a personal channel of a user containing a number of metadata pieces belonging to at least one linear content item and comprises the following steps:

In a first step 710 a number of predefined search strings are stored. In a second step 720, a specified search string is generated by combining at least one metadata piece with at least one predefined search string.

In a third step 730, a search engine is controlled with the generated specified search string for retrieving a non-linear content item being related to the at least one linear content item.

In a forth step 740, an electronic recommendation signal is provided to the user in dependence of the retrieved non-linear content item.

In summary, the invention relates to an apparatus, a video system, a method and a corresponding computer program and a computer readable medium for managing a personal channel of a user. The apparatus is configured to control a search engine with a specified search string that the apparatus has generated by combining a predefined search string and a metadata piece. Thereby, the apparatus retrieves a non-linear content item being similar to a specific linear content item being referenced by the metadata piece and causes a recommendation to the user to add the retrieved non-linear content item to his personal channel.

The invention can in particular be applied to any recommender system for set-top boxes, TV sets, mobile phones, personal digital assistants (PDAs), personal computers (PCs), personal video recorders (PVRs), audio systems (including portable audio), Internet services (including audio and video services), and all devices where a personal channel is employed. The invention is thus not restricted to recommenders of television or film content, but can be applied to music, theatre shows, books and all types of products and services for which recommenders can be built.

While the invention has been illustrated and described in detail in the drawings and the foregoing description, such illustration and description are to be considered illustrative or exemplary and not restrictive. The invention is not limited to the disclosed embodiments.

From reading the present disclosure, other modifications will be apparent to persons skilled in the art. Such modifications may involve other features which are already known in the art and which may be used instead of or in addition to features already described herein.

Variations to the disclosed embodiments can be understood and effected by those skilled in the art, from a study of the drawings, the disclosure and the appended claims. In the claims, the word "comprising" does not exclude other elements or steps, and the indefinite article "a" or "an" does not exclude a plurality of elements or steps. A single processor or other unit may fulfil at least the functions of FIGS. 1 and 2 based on corresponding software routines.

The computer program may be stored/distributed on a suitable medium, such as an optical storage medium or a solid-state medium supplied together with or as part of other hardware, but may also be distributed in other forms, such as via the Internet or other wired or wireless telecommunication systems. The mere fact that certain measures are recited in mutually different dependent claims does not indicate that a combination of these measures cannot be used to advantage. Any reference signs in the claims should not be construed as limiting the scope thereof.

What is claimed is:

1. An apparatus for managing a personal channel of a user containing a number of metadata pieces belonging to at least one linear content item, the apparatus comprising:
   a search string memory containing a number of predefined search strings,
   a search string generator configured to generate a specified search string by logically combining at least one piece of metadata with at least one predefined search string,
   a transceiver configured to control a search engine with the generated specified search string for retrieving a non-linear content item being semantically related to the at least one linear content item, and
   a recommender engine configured to cause providing of an electronic recommendation signal to the user in dependence of the retrieved non-linear content item so that the user can add the non-linear content item to the personal channel that is semantically related to the linear content that is already in the personal channel, wherein the non-linear content item is of a different genre and/or of a different category than the specific linear content item, and wherein
   the transceiver is additionally configured to iteratively control the search engine with at least one of the number of metadata pieces for automatically updating the search string memory by providing at least a part of a name of a search result, which has comparatively frequently occurred during the iterative operation of the search engine, as an additional predefined search string to the search string memory, said additional predefined search string comprising at least the part of the name of the search result, which has comparatively frequently occurred during the iterative operation of the search engine.

2. The apparatus according to claim 1, wherein the metadata pieces are provided by an electronic program guide EPG.

3. The apparatus according to claim 2, wherein the search string generator is configured to generate the specified search string by linking the at least one piece of metadata with the at least one predefined search string through a Boolean term.

4. The apparatus according to claim 3, wherein
   the number of metadata pieces of the personal channel is present in the form of a plurality of metadata strings, each of the plurality of metadata strings specifying one aspect of the at least one linear content item,
   a number of predefined search strings is associated to one of the plurality of metadata strings and
   the search string generator is configured to generate the specified search string by combing at least one metadata string with at least one associated predefined search string.

5. The apparatus according to claim 4, wherein the apparatus additionally comprises
   a first input that allows for manually adding a user predefined search string to the search string memory.

6. The apparatus according to claim 5, wherein
   the apparatus comprises a second input that allows for receiving a user initiated feedback signal and
   the search string generator is configured to generate the specified search string in dependence of the received feedback signal.

7. A video system having a receiver and a display, the receiver being configured to receive a linear content item provided by a broadcasting station and to receive a non-linear content item provided by a computer implemented network and the display being configured to display a received linear content item and a received non-linear content item, wherein
   the receiver comprises a memory for storing a personal channel of a user and the apparatus according to claim 1 for managing the personal channel, the apparatus having an access to a search engine being coupled to the computer implemented network and
   the apparatus is additionally configured to provide the electronic recommendation signal to the user via the display.

8. The apparatus according to claim 1, wherein the search string generator is configured to generate the specified search string by linking the at least one piece of metadata with the at least one predefined search string through a Boolean term.

9. The apparatus according to claim 1, wherein
   the number of metadata pieces of the personal channel is present in the form of a plurality of metadata strings, each of the plurality of metadata strings specifying one aspect of the at least one linear content item,
   a number of predefined search strings is associated to one of the plurality of metadata strings and
   the search string generator is configured to generate the specified search string by combing at least one metadata string with at least one associated predefined search string.

10. The apparatus according to claim 1, wherein the apparatus additionally comprises
    a first input that allows for manually adding a user predefined search string to the search string memory.

11. The apparatus according to claim 1, wherein
    the apparatus comprises a second input that allows for receiving a user initiated feedback signal and
    the search string generator is configured to generate the specified search string in dependence of the received feedback signal.

12. A method for managing a personal channel of a user containing a number of metadata pieces belonging to at least one linear content item, the method comprising the steps of:
    storing a number of predefined search strings,
    generating a specified search string by logically combining at least one metadata piece with at least one predefined search string,
    controlling a search engine with the generated specified search string for retrieving a non-linear content item being semantically related to the at least one linear content item, wherein the non-linear content item is of a different genre and/or of a different category than the specific linear content item and
    providing an electronic recommendation signal to the user in dependence of the retrieved non-linear content item so that the user can add the non-linear content item to the personal channel that is semantically related to the linear content that is already in the personal channel, wherein the step of controlling additionally comprises: iteratively controlling the search engine with at least one of the number of metadata pieces for automatically updating the number of stored predefined search strings by providing at least a part of a name of a search result, which has comparatively frequently occurred during the iterative operation of the search engine, as an additional predefined search string to the stored predefined search strings, said additional predefined search string comprising at least the part of the name of the search result, which has comparatively frequently occurred during the iterative operation of the search engine.

13. A non-transitory computer readable medium having computer readable code means embodied thereon, said computer readable program code means being operative to cause a programmable system when executing said computer readable code means to perform the managing method as claimed in claim 12.

14. An apparatus for managing a personal channel of a user containing a number of metadata pieces belonging to at least one linear content item, the apparatus comprising:
- a search string memory containing a number of predefined search strings,
- a search string generator configured to generate a specified search string by logically combining at least one piece of metadata with at least one predefined search string,
- a transceiver configured to control a search engine with the generated specified search string for retrieving a non-linear content item being related to the at least one linear content item, and
- a recommender engine configured to cause providing of an electronic recommendation signal to the user in dependence of a retrieved non-linear content item, wherein the non-linear content item is of a different genre and/or of a different category than the specific linear content item, and wherein the transceiver is additionally configured to iteratively control the search engine with at least one of the number of metadata pieces for automatically updating the search string memory by providing at least a part of a name of a search result, which has comparatively frequently occurred during the iterative operation of the search engine, as an additional predefined search string to the search string memory, said additional predefined search string comprising at least the part of the name of the search result, which has comparatively frequently occurred during the iterative operation of the search engine, and wherein the apparatus comprises a second input that allows for receiving a user-initiated feedback signal with which the user can rate the recommendation made to the user, wherein the recommender engine is configured to monitor the user feedback signal and to cause providing of the subsequent electronic recommendation signals accordingly, and wherein the search string generator is configured to generate the specified search string in dependence of the received feedback signal via the second input.

* * * * *